Oct. 13, 1959 J. E. BRILL 2,908,309
THREADLESS PLASTIC NUT HAVING STEPPED BORE SECTIONS
Filed Oct. 30, 1956 2 Sheets-Sheet 2

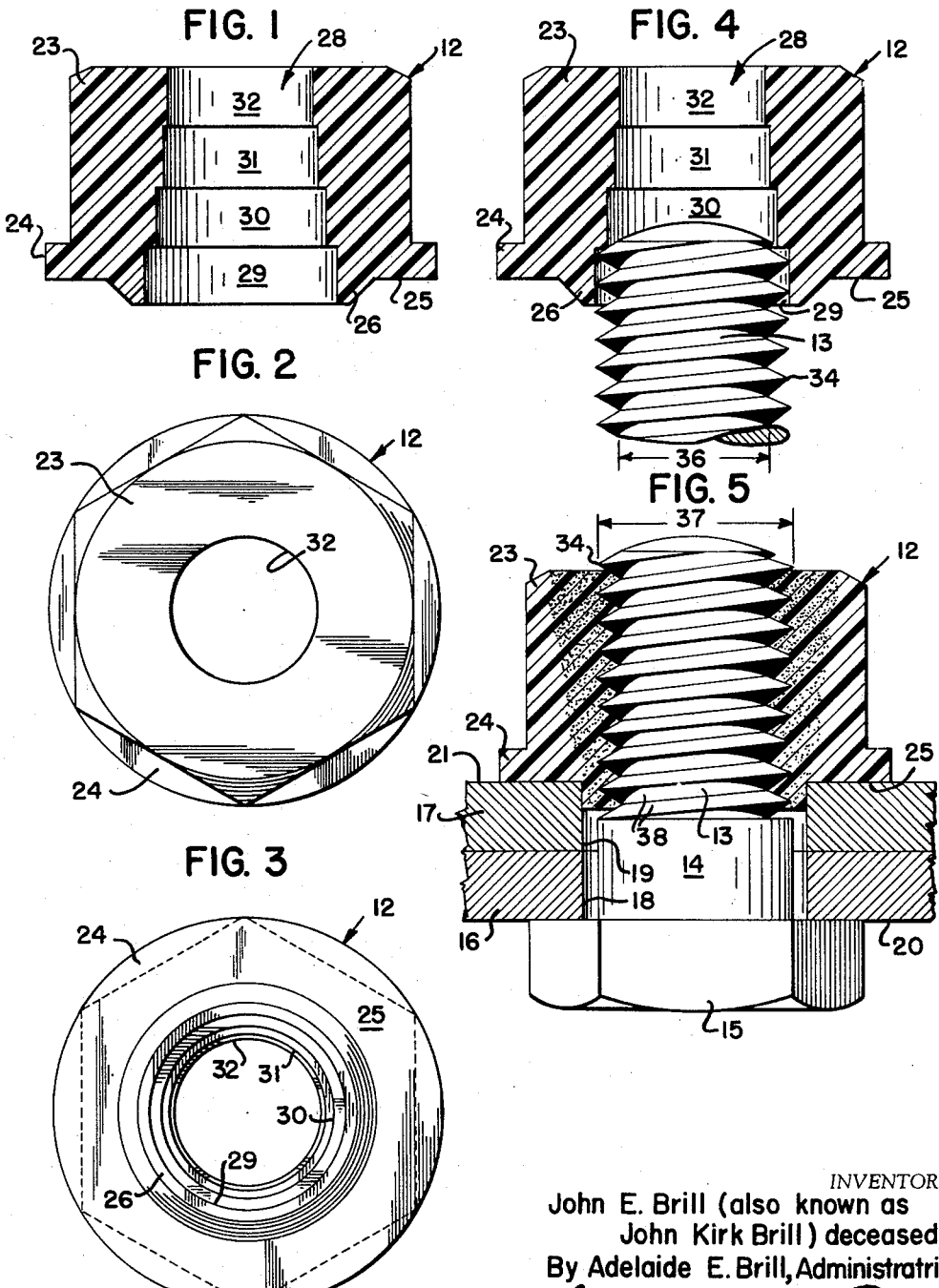

INVENTOR
John E. Brill (also known as
John Kirk Brill) deceased,
By Adelaide E. Brill, Administratrix
BY
ATTORNEYS

United States Patent Office 2,908,309
Patented Oct. 13, 1959

2,908,309

THREADLESS PLASTIC NUT HAVING STEPPED BORE SECTIONS

John E. Brill, deceased, late of Jamestown, N.Y., by Adelaide E. Brill, administratrix, Yonkers, N.Y.

Application October 30, 1956, Serial No. 619,177

1 Claim. (Cl. 151—7)

This invention relates to nuts for use on screw threaded shanks, and is a continuation-in-part of an application for patent relating to self-locking and self-sealing plastic fastening devices filed in the name of John K. Brill (now deceased), October 6, 1955, Serial No. 538,986.

The last mentioned application discloses among other things a nut essentially consisting solely of synthetic linear polyamide and in which a section of the bore is threaded complementary to the thread of the shank for which the nut is intended, and another section is unthreaded and of a diameter less than the diameter of thread of the shank, whereby the nut may be turned onto the shank by engagement of the threaded section of the bore thereof with the thread of the shank, and by further turning of the nut, some of the synthetic linear polyamide will be displaced to accommodate the thread in the zone of said normally unthreaded section of the bore.

The principal objects of the present invention are to provide nuts which do not require the production of a thread in the bores thereof, as by thread cutting machine or by a molding operation, thereby reducing the cost of manufacture of the nuts of synthetic linear polyamide, still enabling workmen to quickly and conveniently apply the nuts to screw threaded shanks; and to provide nuts which may be used with shanks, the threads of which need not necessarily have a predetermined type of thread, but rather may be of the V-type, the Sellers type, the Whitworth type or any other suitable type and may have any of a wide range of thread convolutions per inch, such as a wide range of so-called "number of threads per inch." Examples of these differences are clear from a consideration of tables showing such for United States Standard coarse and fine threads and Truncated Whitworth Form, coarse and fine, by way of example.

Another object is to provide nuts of the general character disclosed in the aforesaid application Serial No. 538,986 in which the body portion of each nut is provided with a planar work engaging face normal to the axis of the bore and an annular frusto-conical protuberance extending from the nut body at that planar face concentric with the bore, but in which the bore of the protuberance is unthreaded but still functions to act as a sealing medium around any appropriate hole in the work through which the shank extends, when the nut is turned tight, and with the planar face of the nut body engaging the work. This protuberance, when the nut is in use, also functions to resist unscrewing of the nut by a portion of it being displaced to frictionally engage the sides (surface of the thread which connects the crest with the root) of the convolutions of the thread.

Other objects and advantages will appear in the following detailed description of three embodiments of the invention, taken in connection with the accompanying drawings, forming a part of this specification, and in which drawings:

Fig. 1 is a central, vertical sectional view through one form of nut according to the instant invention.

Figs. 2 and 3 are top and bottom plan views, respectively of the same.

Fig. 4 is a fragmentary view in elevation of the screw threaded end of a shank, partly entered into the bore of the nut, the latter being shown in vertical section.

Fig. 5 is a view similar to Fig. 4 but also showing the shank as a part of a headed bolt which fastens together two pieces of work, and with the nut turned on the shank in locking relation thereto and in sealing relation to the work.

Figure 6:
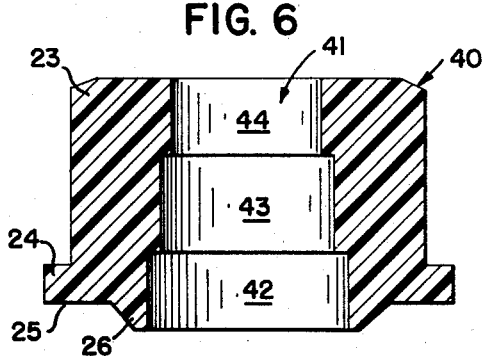
Fig. 6 is a view similar to Fig. 1, but showing a modified form of the invention.

Referring to Figs. 1–5 there is shown a nut 12 which essentially consists solely of synthetic linear polyamide. In practice it has been found, at the present time, that such nylons commercially known as du Pont FM 10001 and du Pont Zytel 101 have great tensile strength and suitable physical, thermal and electrical characteristics for this purpose. In Figs. 4 and 5 the nut is shown in association with a screw threaded end portion 13 of a shank 14 and in Fig. 5 the shank has a head 15 forming a bolt, with work pieces 16 and 17 secured together by the passage of the shank 14 through openings 18 and 19 in the pieces 16 and 17, respectively, and with the head 15 engaging the exposed face 20 of piece 16 and the nut 12 turned tight against the exposed face 21 of piece 17.

The nut has a substantially inflexible body, so that a tool may be applied thereto without deformation of the tool engaging faces thereof, and the nut may be securely tightened upon a threaded member. The interior bore of the nut forms a deformable, but not a resilient thread engaging surface, so that the surface thereof will be somewhat scored by the threads entering thereinto, and also be slightly deformed about the threads, forming a locking engagement with the threaded member.

The nut 12, in the example shown, comprises a polygonal shaped body 23, hexagonal in this instance, preferably provided with an integral base or washer-like flange 24 at its lower portion, which flange, together with the body 23 presents a planar work engaging face 25, and an integral annular frusto-conical protuberance 26 extending from the planar face 20. Generally speaking, these characteristics are substantially the same as the example of the nut shown in the aforesaid application Serial No. 538,986.

An unthreaded axial bore 28 extends through the body 23 and protuberance 26, with the axis of the bore normal to the planar face 25, and in the example shown in Figs. 1–5, this bore is provided with four stepped sections 29, 30, 31 and 32 of different diameters, which bear some relationship to characteristics of the screw threaded portion 13 of the shank 14 for which the nut is intended and for most efficient use.

In the example shown the shank 14 is provided with a V-thread 34, although the thread may be of any other suitable type, such as of the Sellers or Whitworth types, the thread having a major diameter indicated at 37 and a minor diameter 36. The sides of the thread, that is, the surface which connects the crest with the root are indicated at 38.

The nut 12 is molded or otherwise formed so that the diameter of bore section 29, appropriately termed the first bore section, is of a diameter approximately the major diameter 37 of the thread 34, and it, in the example shown, extends through the protuberance 26 and is located at the end of the bore nearest the planar face 25. Thus the nut 12 may be disposed on the threaded portion 13 of the shank 14 with little effort and with the axis of the bore 28 coinciding with the axis of the shank. The nut 12 is molded or otherwise formed so that the diameter of bore section 32, appropriately termed the second bore section, is of a diameter approximately the diameter 36 of the thread 34. The nut 12 is also molded or otherwise formed so that the bore sections 30 and 31, each appropriately termed an intermediate section, are each of a diameter less than the major diameter 37 and greater than the minor diameter 36 of the thread 34. In the example shown the bore sections 30 and 31 are of diminished diameters in the order from the first bore section 29 to the second bore section 32. Thus, after placing the nut on the threaded end of the shank 14 as shown in Fig. 4 imparting a turning movement to the nut, in the proper direction, the thread 34 will first displace the material of the nut at the bore section 30 to accommodate the thread 34 at the zone of the sides 38 of the thread adjacent the crest of the thread. Further turning of the nut will then displace the material of the nut at the bore section 31, to accommodate the thread 34 at the zone of the sides 38 of the thread, not only adjacent the crest of the thread, but also at the zone near the root of the thread. This displacement of the material of the nut at the bore zone 31 also crowds the material of the nut into the convolutions of the thread 34 in the zone of bore section 30. Finally turning the nut further will displace the material at the bore section 32, to accommodate the thread 34 filling the space between the convolutions of the thread and displacing some of the material from which the nut is made, so as to substantially fill the space between the convolutions in the zones of bore sections 30 and 31. If the nut is provided with the protuberance 26, material of it will be displaced to substantially fill the space between the convolutions of the thread at the zone of bore section 29 and seal the opening 19, as shown in Fig. 5 when the planar face 25 of the nut engages the face 21 of the work piece 17.

While the effort to place the nut 12 in holding position is slightly greater than required in placing a nut in holding position according to the form of invention disclosed in the aforesaid application Serial No. 538,986, tests show such effort is not detrimental. For instance, test made with nuts made according to the form of invention shown in Figs. 1-5 for a threaded member having a ¼" major diameter with thread of the United States Standard type, twenty threads to the inch, required a maximum installation torque in inch pounds of 10 to 12½ whereas nuts made according to the teaching in the aforesaid application Serial No. 538,986 with the nut tapped one-half the length of the bore for the same size threaded shank required a maximum installation torque in inch pounds of 8½ to 12. These tests also revealed some superior characteristics of the nut according to the present invention, such as an initial breakloose torque in inch pounds of 10 to 11 and for the nut partially tapped, 7 to 12. The torsional stripping strength in inch pounds was found to be 28 to 33 as compared with 21 to 25.

Figure 7:
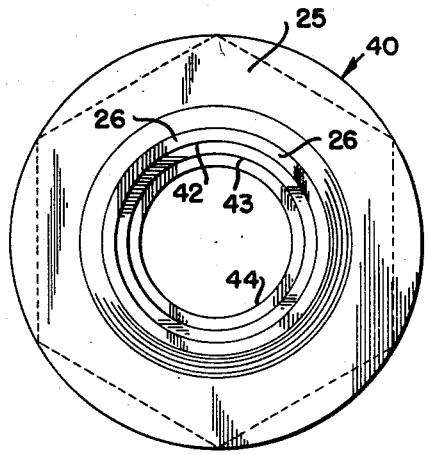
Fig. 7 is a bottom plan view of the nut shown in Fig. 6.

In Figs. 6 and 7 a modified type of nut 40 is shown preferably having the same characteristics as nut 12 with respect to body 23, flange 24, planar work engaging face 25 and frusto-conical protuberance 26. However, while the nut 40 is provided with an axial bore 41 which extends through the body 23 and protuberance 26 with its axis normal to the planar face 25, it has only three stepped sections 42, 43 and 44. Of these the bore sections 42 and 44 have diameters corresponding to the diameters of sections 29 and 32, respectively of the nut shown in Figs. 1-4. The bore section 43, appropriately termed the intermediate bore section, is formed to have a diameter less than the diameter of bore section 42 and greater than the diameter of bore section 44. Tests of a character like those conducted as above set forth, but with nuts made according to this modification 40 showed about the same initial breakloose torque in inch pounds i.e., 10 to 11, and the same stripping strength in inch pounds, i.e., 28 to 33, but slightly less tensile strength, that is in pounds 830 to 885 for nut 40 as compared with 870-940 for nut 12.

Figure 8:
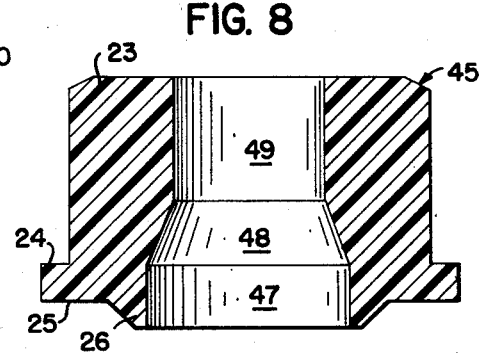
Fig. 8 is a view similar to Figs. 1 and 6, but showing a further modified form of the invention.
Figure 9:
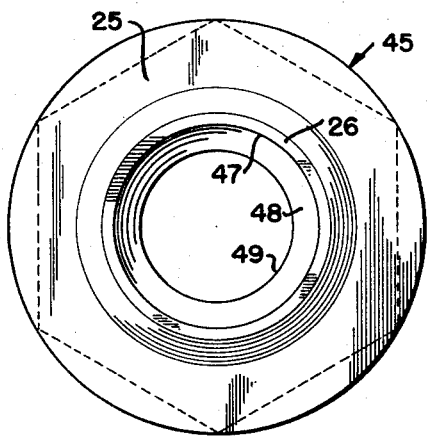
Fig. 9 is a bottom plan view of the nut shown in Fig. 8.

In Figs. 8 and 9 is shown a further modification of the threadless nut 45 preferably having the same characteristics of nuts 12 and 40 with respect to body 23, flange 24, planar work engaging face 25 and frusto-conical protuberance 26. However, while the nut 45 is provided with an axial bore 46 which extends through the body 23 and protuberance 26 with its axis normal to the planar face 25, and has only three sections 47, 48 and 49. Of these the bore sections 47 and 49 have diameters corresponding to the diameters of sections 29 and 32 or 42 and 44 of nuts 12 and 40, respectively. The bore section 48, appropriately termed the intermediate bore section, is frusto-conical in shape with its greatest diameter at the inner end of bore section 47 and its smallest diameter at the inner end of bore section 49. In this form of nut 45 it is preferred to have the bore section 49 deeper than each of the bore sections 47 and 48, such as a depth as to bore section 49 substantially equal to the combined depth of bore sections 47 and 48.

While the nuts herein disclosed and having the characteristic diameters of bore sections for use with threaded shanks having major and minor thread diameters of related dimensions are particularly well adapted for use by manufacturers using nuts as fastening means in large scale production of devices and equipment, and where speed in assembly is highly desirable, the nuts will be found useful to quite some extent where odd dimensioned screw threaded shanks are encountered such as tapered screws or those having major diameters slightly greater than the diameter of the first or lead bore sections of the nuts. If such lead bore section is of slightly less diameter than the major diameter of the screw, the nut can initially be forced on the screw without turning the nut or screw, since the nut being made solely of synthetic linear polyamide the thread of the screw will push the nut material aside until an intermediate bore section in the nut is reached, whereupon a turning movement of the nut or screw, one with respect to the other is necessary to bring about effective holding characteristics. However the lead bore section will effectively center the nut coaxial with the screw so the nut will not assume a slanted or cocked position before and during the turning movement required to tighten the two for effective holding properties. This is in contradistinction to nuts of the type which have been proposed in the past having a frusto-conical lead bore section and of a material in which a thread may be cut by the thread of the screw or bolt.

What is claimed is:

A nut for self-threading by turning around a threaded bolt while progressing towards a base surrounding said bolt with an annular gap, comprising a plastic body consisting of synthetic linear polyamide of polygonal section provided with an unthreaded bore and forming a wall for said bore; said wall being terminated at least at one end of said bore by a planar backing surface extending substantially perpendicular to the axis of said bore; at least a first part of said bore removed from said end being deformable when engaged by said bolt; a second part of said bore near said end forming a cylindrical guide for said bolt into said first part of said bore; said second part of said bore being of a diameter approximately equal to the major diameter of the thread of said bolt, and said first part of said bore consisting of two adjoining sections of substantially equal length, one section removed from said second part of said bore, having a diameter approximately equal to the minor diameter of said thread, and another section near said second part of said bore, having a diameter less than the major diameter and greater than the minor diameter of the thread; and said planar backing surface being provided near its center with an annular ridge having substantially the same inner radius as said second part of said bore and projecting from said backing surface coaxially and integrally with said wall, the outer surface of said ridge flaring from its free end outwardly to said backing surface to permit said ridge at the start of said self-threading to center said bolt relative to said backing surface, and at the end of said self-threading to center said backing surface, relative to said annular gap.

References Cited in the file of this patent

UNITED STATES PATENTS

| | | |
|---|---|---|
| 228,816 | Huff | June 15, 1880 |
| 1,356,404 | Robinson | Oct. 19, 1920 |
| 2,439,415 | Bloomfield | Apr. 13, 1948 |
| 2,545,514 | Erb | Mar. 20, 1951 |
| 2,688,499 | Hanson | Sept. 7, 1954 |
| 2,788,829 | Edwards | Apr. 16, 1957 |

FOREIGN PATENTS

| | | |
|---|---|---|
| 7,467 | Great Britain | Mar. 29, 1904 |
| 569,550 | Great Britain | May 29, 1945 |
| 1,062,703 | France | Dec. 9, 1953 |